(12) United States Patent
Katayama et al.

(10) Patent No.: US 11,772,910 B2
(45) Date of Patent: Oct. 3, 2023

(54) LINEAR CONVEYOR

(71) Applicant: YAMAHA HATSUDOKI KABUSHIKI KAISHA, Iwata (JP)

(72) Inventors: Manabu Katayama, Iwata (JP); Motonori Kawauchi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 128 days.

(21) Appl. No.: 17/434,706

(22) PCT Filed: Mar. 20, 2019

(86) PCT No.: PCT/JP2019/011726
§ 371 (c)(1),
(2) Date: Mar. 1, 2022

(87) PCT Pub. No.: WO2020/188791
PCT Pub. Date: Sep. 24, 2020

(65) Prior Publication Data
US 2022/0219919 A1 Jul. 14, 2022

(51) Int. Cl.
*B65G 54/02* (2006.01)
*H02K 41/03* (2006.01)
*H02K 41/02* (2006.01)

(52) U.S. Cl.
CPC ............ *B65G 54/02* (2013.01); *H02K 41/02* (2013.01); *H02K 41/031* (2013.01)

(58) Field of Classification Search
CPC ........ B65G 54/02; H02K 41/02; H02K 41/03; H02K 41/031
(Continued)

(56) References Cited

U.S. PATENT DOCUMENTS

2016/0368718 A1* 12/2016 Kleinikkink ........... B65G 54/02
2019/0131860 A1* 5/2019 Suzuki ................... B65G 54/02

FOREIGN PATENT DOCUMENTS

CN 111806993 * 10/2020 ............ B65G 54/02
JP S61-262067 A 11/1986
(Continued)

OTHER PUBLICATIONS

An Office Action; "Notice of Reasons for Refusal", mailed by the Japanese Patent Office dated Feb. 22, 2022, which corresponds to Japanese Patent Application No. 2021-506090 and is related to U.S. Appl. No. 17/434,706; with English language translation.
(Continued)

*Primary Examiner* — James R Bidwell
(74) *Attorney, Agent, or Firm* — Studebaker & Brackett PC

(57) ABSTRACT

A linear conveyor fixed to a base member includes a transfer slider, a frame including a rail along which the transfer slider is moved in a traveling direction, a first support member that is disposed on one end side of the frame with respect to a longitudinal direction of the frame and is fixed to the base member and the frame and supports the frame, a second support member that is disposed on another end side of the frame with respect to the longitudinal direction of the frame and fixed to the base member and supports the frame such that the frame is not fixed with respect to the second support member, and a sliding mechanism with which the second support member and the frame relatively move in the longitudinal direction according to difference in thermal expansion and contraction amounts of the base member and the frame.

20 Claims, 15 Drawing Sheets

(58) Field of Classification Search
USPC .......................................................... 198/805
See application file for complete search history.

(56) References Cited

FOREIGN PATENT DOCUMENTS

| | | | | |
|---|---|---|---|---|
| JP | 2000-159317 A | 6/2000 | | |
| JP | 2003-324888 A | 11/2003 | | |
| JP | 2004-064874 A | 2/2004 | | |
| JP | 2008-271623 A | 11/2008 | | |
| JP | 2011223700 | * 11/2011 | ............ | B65G 54/02 |
| JP | 2015-050831 A | 3/2015 | | |
| KR | 10-2012-0019299 A | 3/2012 | | |
| WO | 2005/062446 A1 | 7/2005 | | |

OTHER PUBLICATIONS

An Office Action; "Notice of Reasons for Refusal", mailed by the Japanese Patent Office dated May 31, 2022, which corresponds to Japanese Patent Application No. 2021-506090 and is related to U.S. Appl. No. 17/434,706; with English language translation.
International Search Report issued in PCT/JP2019/011726; dated Jun. 11, 2019.

* cited by examiner

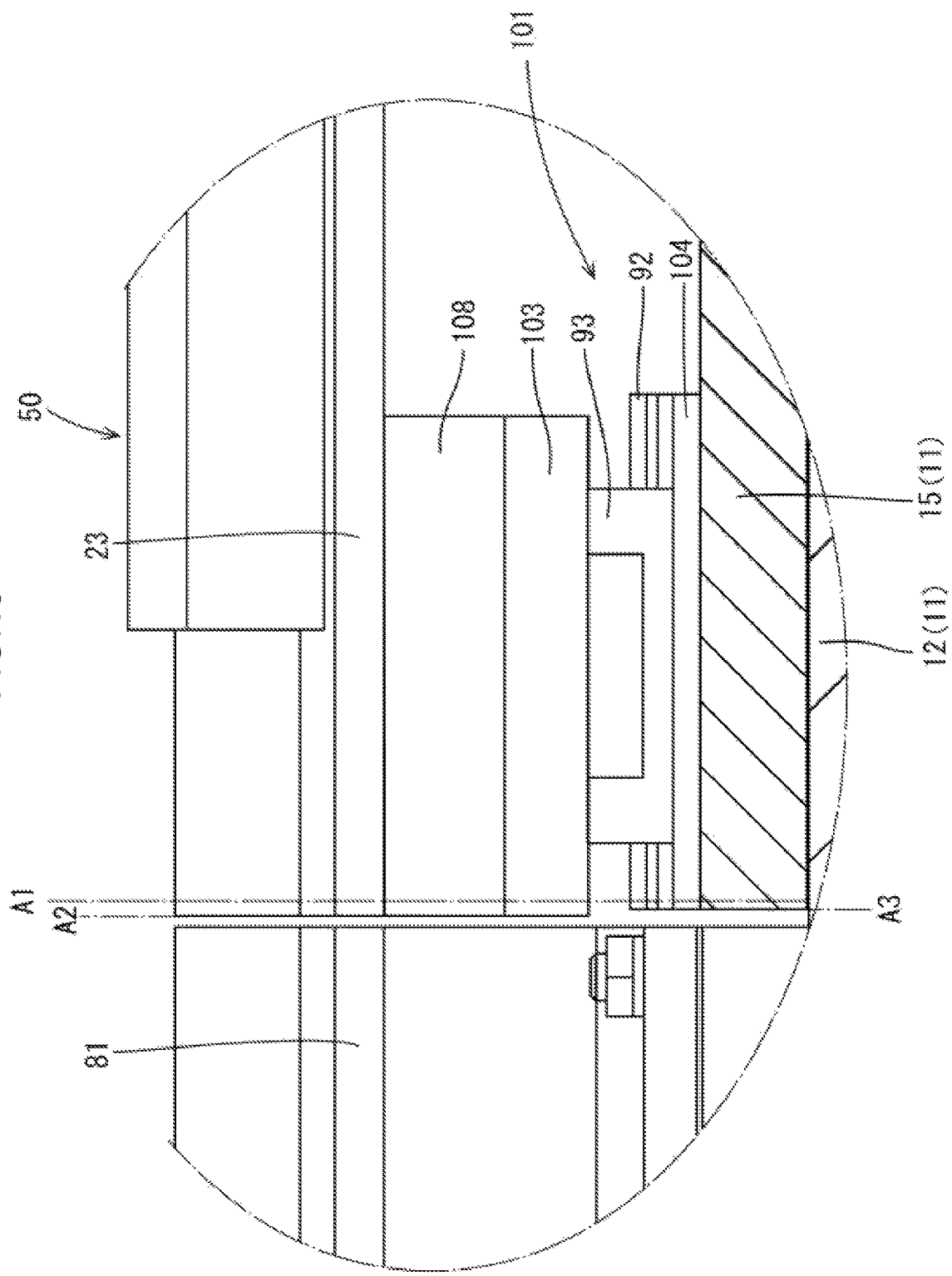

LINEAR CONVEYOR

CROSS-REFERENCE TO RELATED APPLICATION

This application is a National Stage of International Patent Application No. PCT/JP2019/011726, filed Mar. 20, 2019, the entire content of which is incorporated herein by reference.

BACKGROUND

Technical Field

The technology described herein relates to a linear conveyor.

Background Art

There has been known a linear conveyor that moves a transfer slider along a rail. This type of linear conveyor includes a base member, a unit-type fixed module that is fixed to the base member, a linear rail, and a stator including armature coils. The slider includes a rail guide that is guided along the rail and a rotor that is a permanent magnet.

The configuration disclosed in Japanese Unexamined Patent Publication No. 2004-64874 includes a fixed base, a gate-like frame extending along a longitudinal direction on the fixed base, and a pair of armatures. One of the armatures is fixed to the frame and the guide rail and another one of the armatures are fixed to the fixed base. The slider is movably supported by the guide rail. The fixed base and the frame include refrigerant holes through which refrigerant flows and are configured as a refrigerant jacket. The heat exchange is performed with the refrigerant for the heat generated by the armature coils to solve the problems such as thermal deformation of the guide rail.

SUMMARY

In the configuration disclosed in Japanese Unexamined Patent Publication No. 2004-64874, to address issues such as the thermal deformation of the guide rail, the refrigerant needs to be supplied through the refrigerant holes and a circulation pump for flowing the refrigerant is required and this complicates the configuration.

The technology described herein was accomplished in view of the foregoing circumstances. Thus, the present technology provides a linear conveyor that can suppress problems caused by thermal deformation.

A linear conveyor described herein is a linear conveyor fixed to a base member. The linear conveyor includes a transfer slider, a frame including a rail along which the transfer slider is moved in a traveling direction, a first support member that is disposed on one end side of the frame with respect to a longitudinal direction of the frame and is fixed to the base member and the frame and supports the frame, a second support member that is disposed on another end side of the frame with respect to the longitudinal direction of the frame and fixed to the base member and supports the frame such that the frame is not fixed with respect to the second support member, and a sliding mechanism with which the second support member and the frame relatively move in the longitudinal direction according to difference in thermal expansion and contraction amounts of the base member and the frame.

According to the above configuration, the frame is not fixed to the second support member on the other end side in the longitudinal direction of the frame. If the difference in the thermal expansion and contraction amounts is created between the base member and the frame, the warping or deflection of the frame due to the thermal expansion and contraction can be suppressed. Further, the linier conveyor includes the sliding mechanism with which the second support member and the frame relatively move in the longitudinal direction according to difference in thermal expansion and contraction amounts of the base member and the frame. Therefore, the position displacement of the frame in a direction different from the longitudinal direction (for example, in a lateral direction with respect to the longitudinal direction) is less likely to be caused in the portion thereof that is not fixed and near the second support member. Accordingly, the transfer slider can smoothly travel between the adjacent rails.

Embodiments of the technology described herein may preferably have following configurations. The sliding mechanism may be fixed to one of the first support member and the second support member and include a fitting portion that is fitted to another one of the first support member and the second support member so as to be able to slide. According to such a configuration, since the fitting portion is slidably fitted to the other one of the first support member and the second support member, occurrence of warping and deflection of the frame can be suppressed and the traveling between the adjacent rails can be performed smoothly with a simple structure. The sliding mechanism is not necessarily fixed directly to the base member. Therefore, the base member need not have a configuration (such as screw holes) for fixing the sliding mechanism and the sliding mechanism can be additionally installed in the existing configuration easily.

The sliding mechanism may include a tubular portion that is fixed to one of the second support member and the frame, and an insertion portion that is fixed to another one of the second support member and the frame and inserted in the tubular portion so as to be able to slide. According to such a configuration, if the difference is created in the thermal expansion and contraction amounts of the base member and the frame, the position displacement in the direction different from the longitudinal direction is suppressed directly by the frame (not via the first support member).

The tubular portion may include a linear bushing that is slidable with respect to the insertion portion and a holder portion that holds the linear bushing. According to such a configuration, the wearing between the inner surface of the tubular portion and the outer surface of the insertion portion can be suppressed.

The sliding mechanism may include an auxiliary rail that is directly fixed to one of the base member and the frame, and an auxiliary slider that is directly fixed to another one of the base member and the frame and slides with respect to the auxiliary rail. According to such a configuration, the first support member or the second support member is not necessarily processed to provide the sliding mechanism. Therefore, the first support member or the second support member need not be prepared as an exclusive component and this reduces a manufacturing cost. The sliding mechanism can be additionally installed in the existing configuration easily.

The sliding mechanism may include an auxiliary rail that is directly fixed to one of the second support member and the frame, and an auxiliary slider that is directly fixed to another one of the second support member and the frame and slides with respect to the auxiliary rail. According to such a configuration, the frame is not fixed to the second support member by including the auxiliary rails and the auxiliary slider, and this simplifies the configuration.

The linear conveyor may further include a fixed module including the frame, the first support member, the second support member, and the sliding mechanism, and a lifting and lowering device including a lifting and lowering frame including a lifting and lowering rail that is arranged linearly adjacent to the rail of the frame of the fixed module in an elongated direction, and the lifting and lowering device lifting and lowering the transfer slider. According to such a configuration, the transfer slider is lifted or lowered by the lifting and lowering device. Therefore, in the configuration that requires position accuracy between the rails for smooth travel between the rails, problems are less likely to be caused in traveling between the rails.

According to the technology described herein, problems due to thermal deformation in the linear conveyor are less likely to be caused.

BRIEF DESCRIPTION OF THE DRAWINGS

FIG. 15 is an enlarged view illustrating a portion of FIG. 14.

DETAILED DESCRIPTION

First Embodiment

Figure 1:
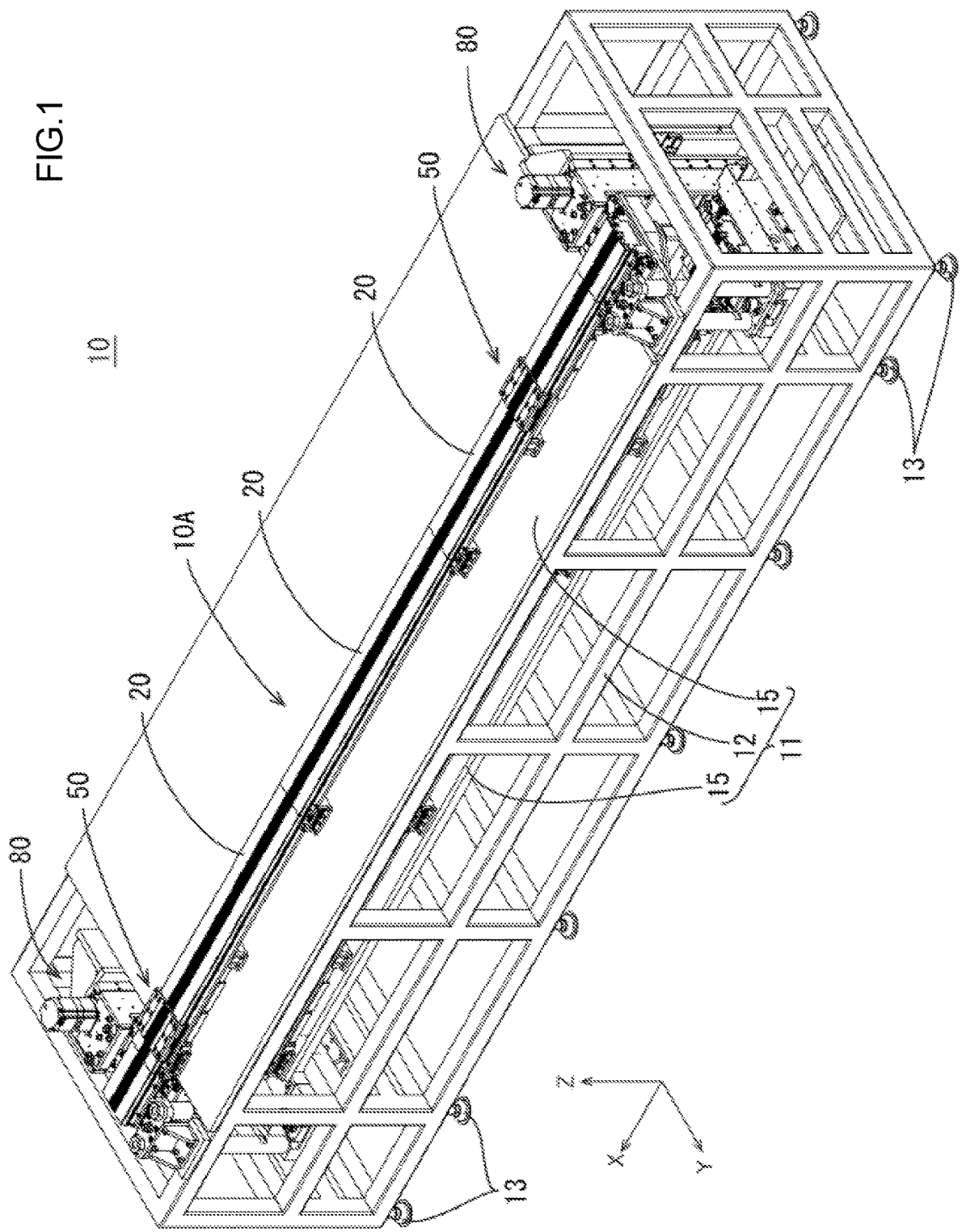
FIG. 1 is a perspective view of a linear conveyor device including a linear conveyor according to a first embodiment.

A linear conveyor 10A of a first embodiment will be described with reference to FIGS. 1 to 8. In the following description, an X-direction, a Y-direction, and a Z-direction in FIG. 1 correspond to a left side, a front side, and an upper side, respectively. As illustrated in FIG. 1, the linear conveyor device 10 includes the linear conveyor 10A and a base member 11 on which the linear conveyor 10A is mounted. The linear conveyor 10A moves a transfer slider 50 by linear motor driving.

The base member 11 includes a base body 12 made of metal such as iron and formed in a matrix and mounting plates 15 on which the linear conveyor 10 is mounted. The base body 12 includes legs 13 on a lower portion thereof and the legs 13 are placed on a floor, which is not illustrated. Each of the mounting plates 15 is a rectangular flat plate. The mounting plates 15 are fixed to the base body 12 at different levels and arranged in an area of the base body 12 except for the two end portions thereof in the longitudinal direction. Two lifting and lowering devices 80 for lifting and lowering the transfer slider 50 are arranged in areas in the base body 12 where the mounting plates 15 are not arranged.

(Whole Configuration of Linear Conveyor 10A)

The linear conveyor 10A includes fixed modules 20, the two lifting and lowering devices 80, and the transfer slider 50. The fixed modules 20 are fixed on the mounting plates 15 of the base member 11 (three fixed modules 20 are disposed on the respective levels and six fixed modules 20 are disposed in total in the present embodiment). The lifting and lowering devices 80 are fixed to the base body 12.

Figure 2:
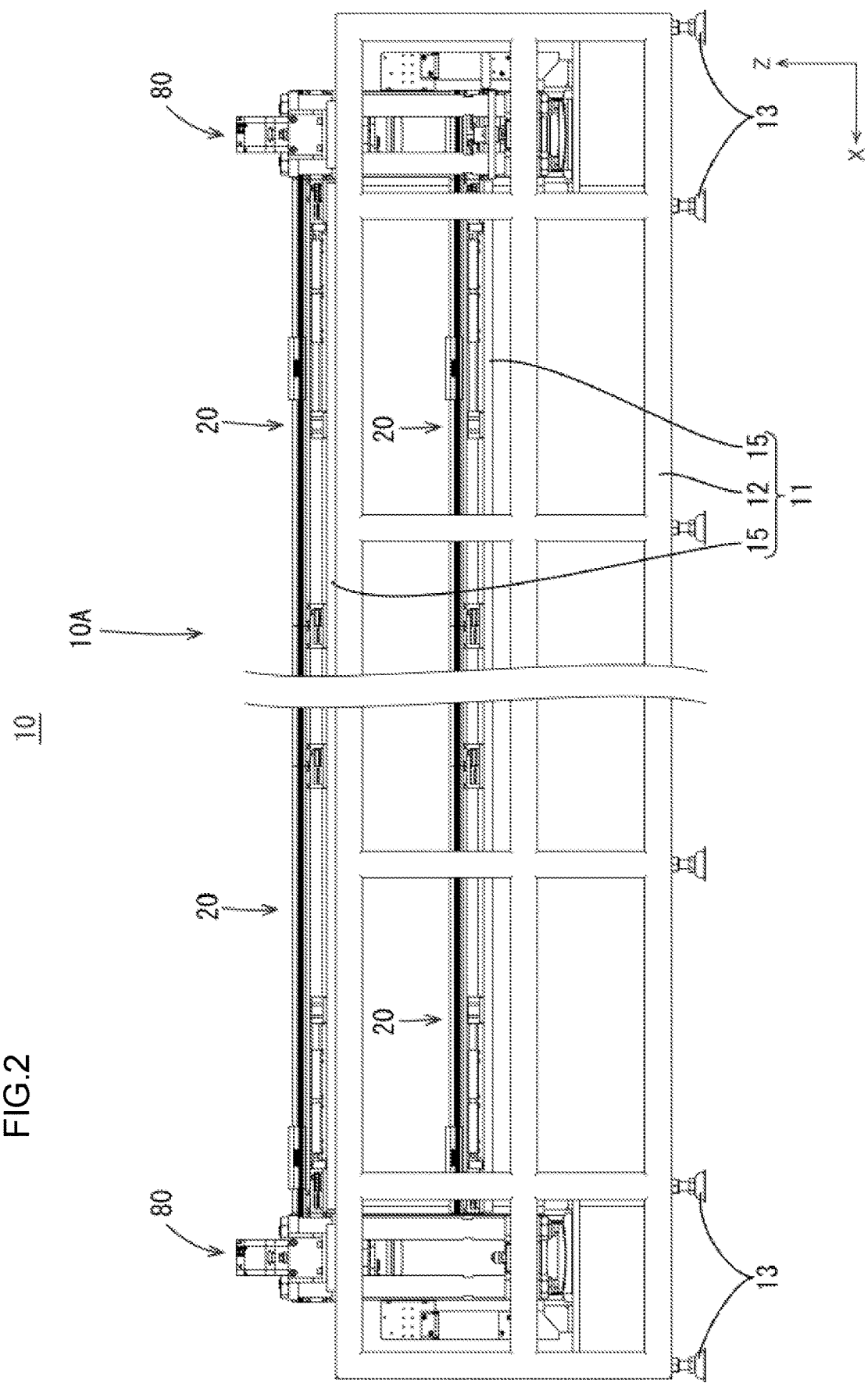
FIG. 2 is a front view of the linear conveyor device.
Figure 4:
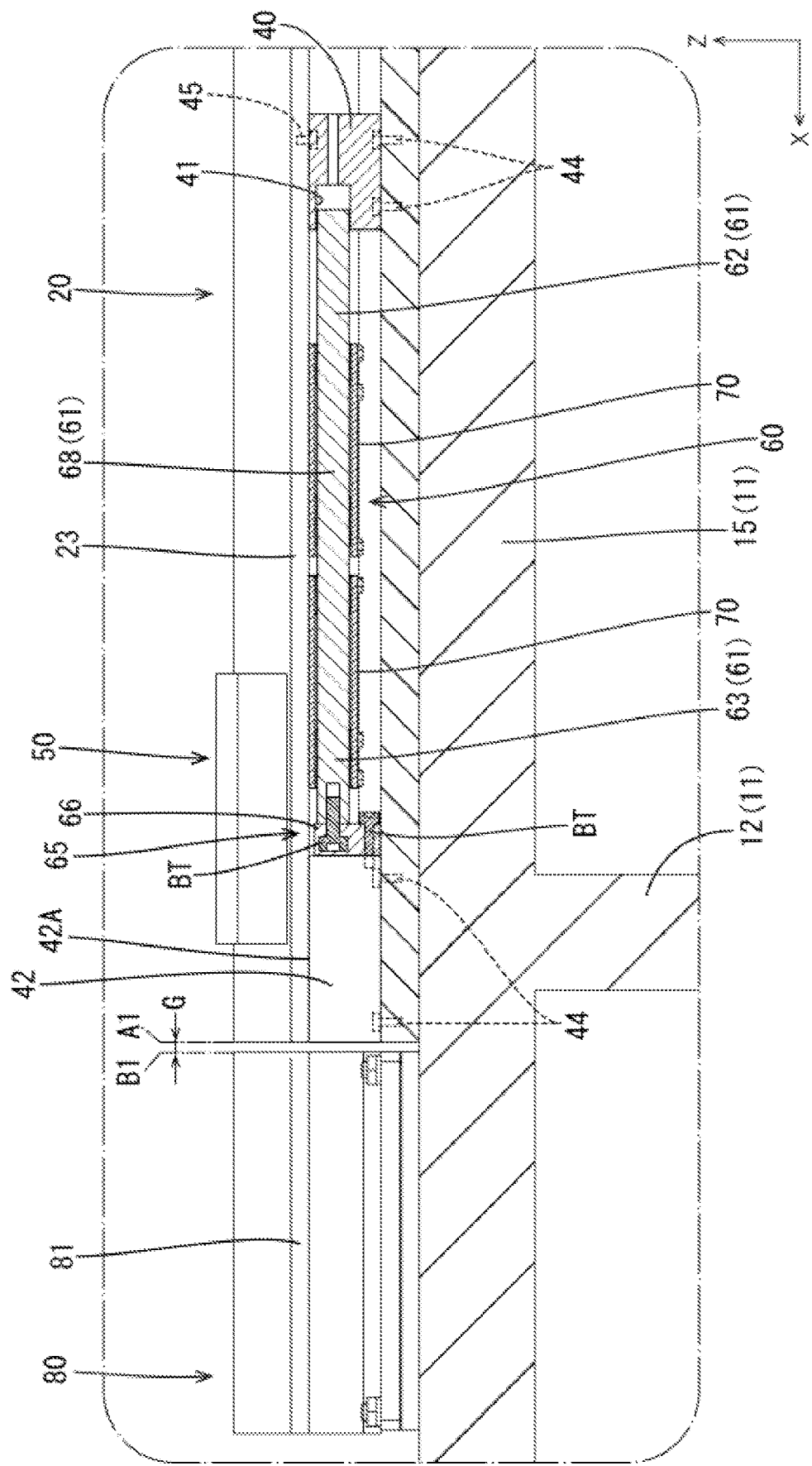
FIG. 4 is a cross-sectional view of a portion of the linear conveyor including a sliding mechanism taken along a X-Z plane.

As illustrated in FIG. 2, the fixed modules 20 are arranged linearly on each of the upper and lower mounting plates 15. As illustrated in FIG. 4, the fixed module 20 includes a metal frame 23, a first support member 40, a second support member 42, and a sliding mechanism 60. The first support member 40 is arranged in a right end portion of the frame 23 (on one end side in a longitudinal direction) and fixed to and supports the frame 23. The second support member 42 is arranged in a left end portion of the frame 23 (on another end side in the longitudinal direction) and supports the frame 23 not to be fixed to the frame 23. The sliding mechanism 60 allows relative sliding movement of the second support member 42 and the frame 23 in a right-left direction.

(Frame 23)

Figure 6:
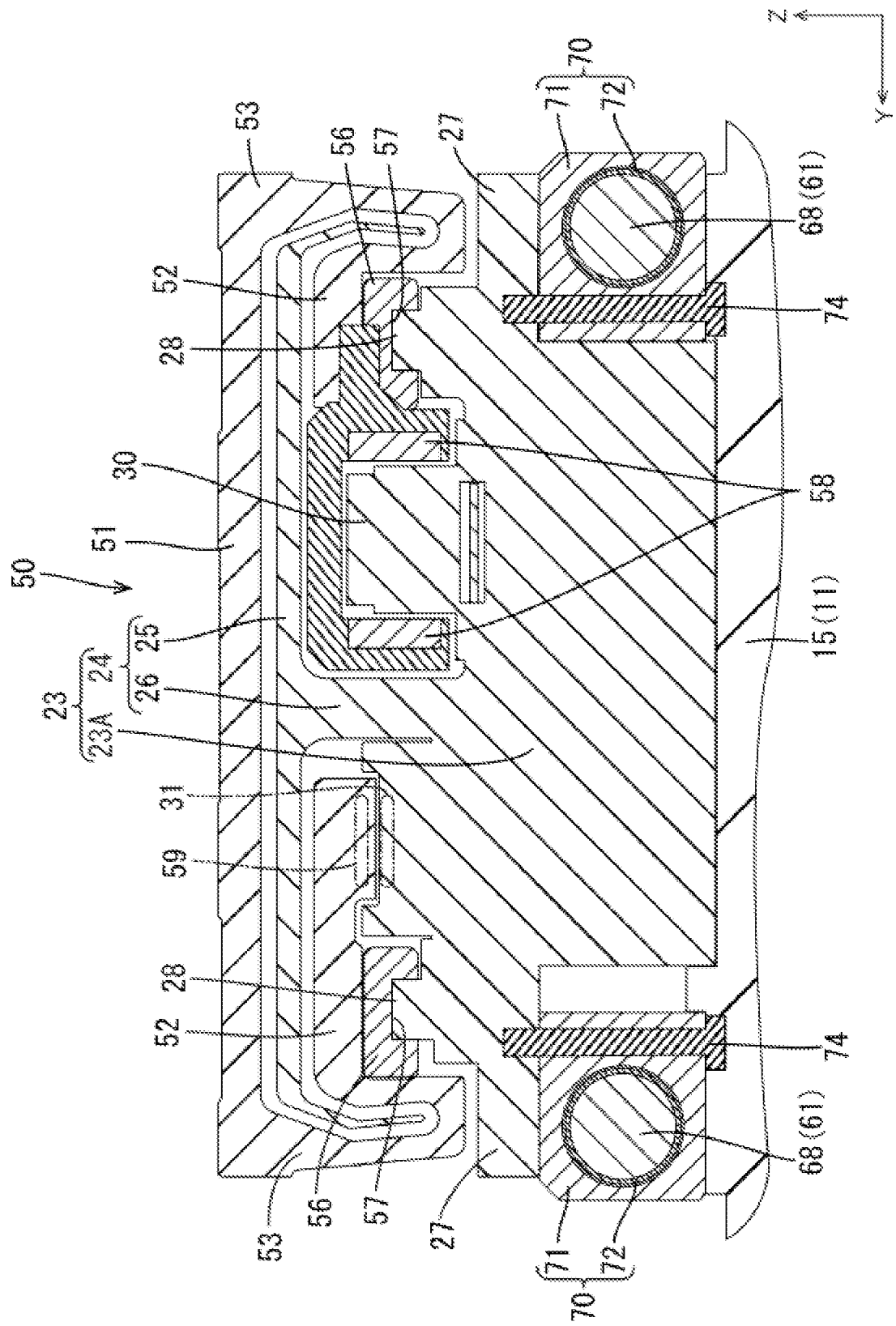
FIG. 6 is a cross-sectional view of a portion of the linear conveyor including the sliding mechanism taken along a Y-Z plane.

The frame 23 is obtained by cutting an extrusion molded object of metal such as aluminum alloy into a product of a predetermined length. The frame 23 extends to have a length of an entire length of the fixed module 20 in a traveling direction and has a same cross-sectional shape over the entire length thereof in the traveling direction. As illustrated in FIG. 6, the frame 23 includes a base body 23A and a top cover 24. The top cover 24 has a cross section of a substantially T-shape and includes a cover body 25 and a separation wall 26. The cover body 25 has a plate shape and the separation wall 26 separates a space below the cover body 25. The cover body 25 protects rails 28 from fallen obstacles and front and rear edge portions thereof are bent and extend downward. The base body 23A includes mount portions 27 extending from front and rear edge portions of the base body 23A, respectively, in the front-rear direction (edge portions with respect to the front-rear direction that is perpendicular to the longitudinal direction of the frame 23). A tubular portion 70 of the sliding mechanism 60, which will be described later, is mounted on the mount portion 27.

The base body 23A includes right and left rails 28, a stator 30, and a magnetic sensor 31 in an upper surface portion thereof. The rails 28 guide the transfer slider 50 in the traveling direction. Each of the rails 28 extends linearly and is fitted in a guide recess 57 of the transfer slider 50 so as to guide the transfer slider 50 to slide linearly. As illustrated in FIG. 4, when the fixed modules 20 and the two lifting and lowering devices 80 that are disposed on the ends of a group of the fixed modules 20 are arranged in a line, the frames 23

(and rails 28) of the fixed modules 20 and lifting and lowering frames 81 of the respective lifting and lowering devices 80 (and lifting and lowering rails 81A of the respective lifting and lowering frames 81) are linearly arranged. In such a configuration, a gap G is created between ends A1, B1 of the adjacent frames 23, 81 and the gap G allows the frame 23 to be thermally expanded and contracted. The rails 28 may be integrally formed with the base body 23A as a unitary part. However, rails may be provided as separate components from the base body 23A and the rails 28 may be attached to the base body 23A.

As illustrated in FIG. 6, the stator 30 is formed in an elongated rectangular cylindrical shape having a quadrangular end surface. The stator 30 includes armature coils therein that are arranged in the traveling direction of the transfer slider 50. The transfer slider 50 is moved along the rails 28 and the stator 30 with the linear motor driving by controlling current supplied to the armature coils. The magnetic sensor 31 includes Hall element or a MR element that can detect a magnetic scale 59. The magnetic sensor 31 is arranged opposite the magnetic scale 59 to detect the position of the transfer slider 50.

(First Support Member 40 and Second Support Member 42)

Figure 5:
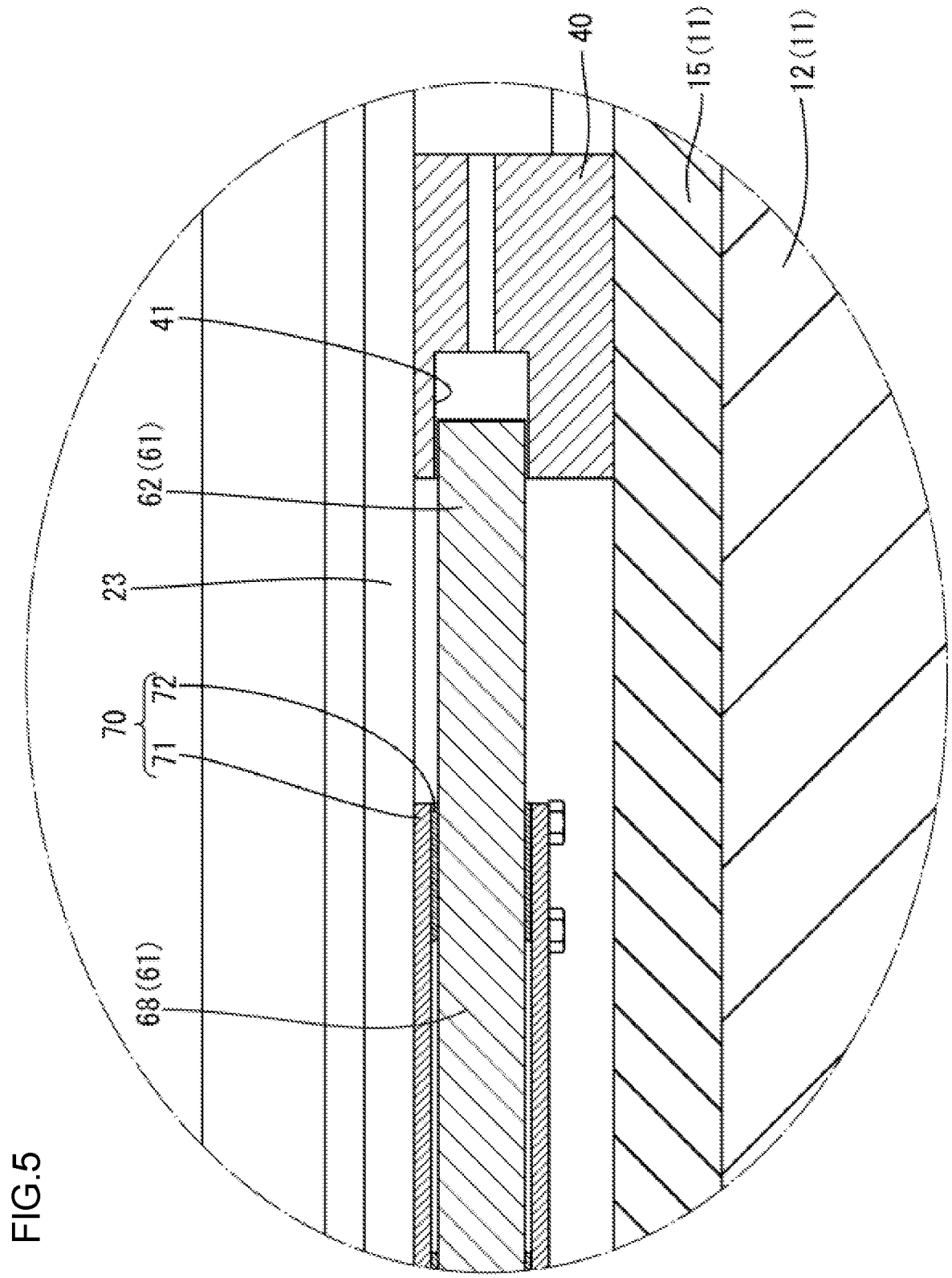
FIG. 5 is an enlarged view of a portion of FIG. 4.

The first support member 40 and the second support member 42 are made of metal such as aluminum alloy and have strength enough for supporting the weights of the frame 23 and the transfer slider 50. The lower portion of the first support member 40 is fixed to the mounting plate 15 of the base member 11 with fixing members 44 such as bolts. As illustrated in FIG. 4, the upper portion of the first support member 40 is fixed (screwed) to the right end portion of the frame 23 (one end portion in the longitudinal direction) with a fixing member 45 such as a bolt. As illustrated in FIG. 5, the first support member 40 includes a fitting portion 41 in which an end portion of a shaft portion 61 of the sliding mechanism 60, which will be described later, is fitted. The fitting portion 41 is a recessed portion recessed in a surface of the first support member 40 facing the second support member 42 and the recessed portion has a circular columnar space therein. The end portion of the shaft portion 61 can be fitted in the fitting portion 41 (while leaving a small space therein).

As illustrated in FIG. 4, the second support member 42 includes a metal case 42A in which a circuit with a board is arranged. The lower portion of the second support member 42 is fixed to the mounting plate 15 of the base member 11 with the fixing members 44 such as bolts. The upper portion of the second support member 42 is not fixed to the left end portion (the other portion in the longitudinal direction) of the frame 23 with the fixing member such as a bolt and relative movement (position displacement) of the frame 23 and the second support member 42 are allowed. The gap G is provided between the adjacent fixed modules 20 (the frames 23) and between the fixed module 20 (the frame 23) and the lifting and lowering device 80 (the lifting and lowering frame 81) to absorb thermal expansion and contraction of the frame 23.

(Transfer Slider 50)

As illustrated in FIG. 6, the transfer slider 50 includes an opposing portion 51, two insertion portions 52, and two connection portions 53. The opposing portion 51 is opposite the cover body 25 of the top cover 24 of the frame 23. The two insertion portions 52 are inserted in a space between the top cover 24 and the base body 23A. The two connection portions 53 are formed in a U-shape and connect the opposing portion 51 and the respective insertion portions 52. Rail guides 56 are fixed to the respective insertion portion 52 and have recesses opening downward. Each of the rail guides 56 includes a guide recess 57 extending in the traveling direction of the transfer slider 50. The rails 28 are fit in the respective guide recesses 57 and balls (not illustrated) that are arranged in the guide recesses 57 are contacted with the rails 28 and rolled.

A rotor 58 including permanent magnets is arranged on one of the insertion portions 52 and the permanent magnets are arranged along the traveling direction of the transfer slider 50. The magnetic scales 59 are arranged on another one of the insertion portions 52. Each of the magnetic scales 59 includes a magnet such as a neodymium magnet and the magnetic scales 59 are arranged in the traveling direction of the transfer slider 50. Each of the magnetic sensors 31 detects the opposing magnetic scale 59 and detects the position of the transfer slider 50.

The transfer slider 50 is moved by driving the fixed modules 20 and the two lifting and lowering devices 80. The transfer slider 50 is moved in the traveling direction along the rails 28 of the fixed modules 20 and moved over the end of the frame 23 near the lifting and lowering device 80 and onto the lifting and lowering frame 81 of the lifting and lowering device 80. In the linear conveyor 10A, the transfer slider 50 is stopped at a predefined component supply position during a transfer process and operations such as supplying of components, screwing, and sealing are performed.

(Sliding Mechanism 60)

As illustrated in FIG. 4, the sliding mechanism 60 includes a shaft portion 61, tubular portions 70 (two tubular portions 70 in this embodiment), and the fitting portion 41. The shaft portion 61 is inserted through the tubular portions 70. The fitting portion 41 has a recessed shape such that the end portion of the shaft portion 61 is fitted in the recessed shape.

The shaft portion 61 has a circular columnar bar shape elongated in the traveling direction of the transfer slider 50. The shaft portion 61 has a fitting portion 62 in a right end portion thereof (one end portion in the elongated direction) and the fitting portion 62 is fitted in the fitting portion 41 included in a left edge portion of the first support member 40. The fitting portion 62 is slidably fitted in the fitting portion 41. The shaft portion 61 has a fixed portion 63 in a left end portion thereof (another end portion in the elongated direction) and the fixed portion 63 is fixed to the second support member 42 with a connection fixing portion 65. The connection fixing portion 65 includes a fixing plate 66 and bolts BT as a screwing member for fixing the fixing plate 66 to the second support member 42 and the shaft portion 61. The fixing plate 66 includes screw holes and the bolts BT are inserted through the screw holes and screwed up and the second support member 42 and the shaft portion 61 are fixed to each other (the relative movement of the second support member 42 and the shaft portion 61 is restricted).

The shaft portion 61 has an insertion portion 68 between the two end portions thereof (between the fixed portion 63 and the fitting portion 62). The insertion portion 68 is inserted in the tubular portions 70 that extend below the frame 23 so as to slide along the tubular portions 70. The tubular portions 70 are fixed to each of the mount portions 27 of the frame 23 and are arranged in the right-left direction between the first support member 40 and the second support member 42. As illustrated in FIG. 5, each of the tubular portions 70 includes a holder portion 71 made of metal such as aluminum alloy and linear bushings 72 that are provided in two end portions of the holder portion 71, respectively, with respect to an axial direction. As illustrated in FIG. 6, the holder portion 71 is fixed to the mount portion 27 of the frame 23 with a fixing member 74 such as a bolt. The linear bushings 72 are made of metal or synthetic resin and prevent the wearing between the insertion portion 68 and the tubular portion 70. The linear bushings 72 may include balls to move the shaft portion 61 smoothly.

(Two Lifting and Lowering Devices 80)

Figure 3:
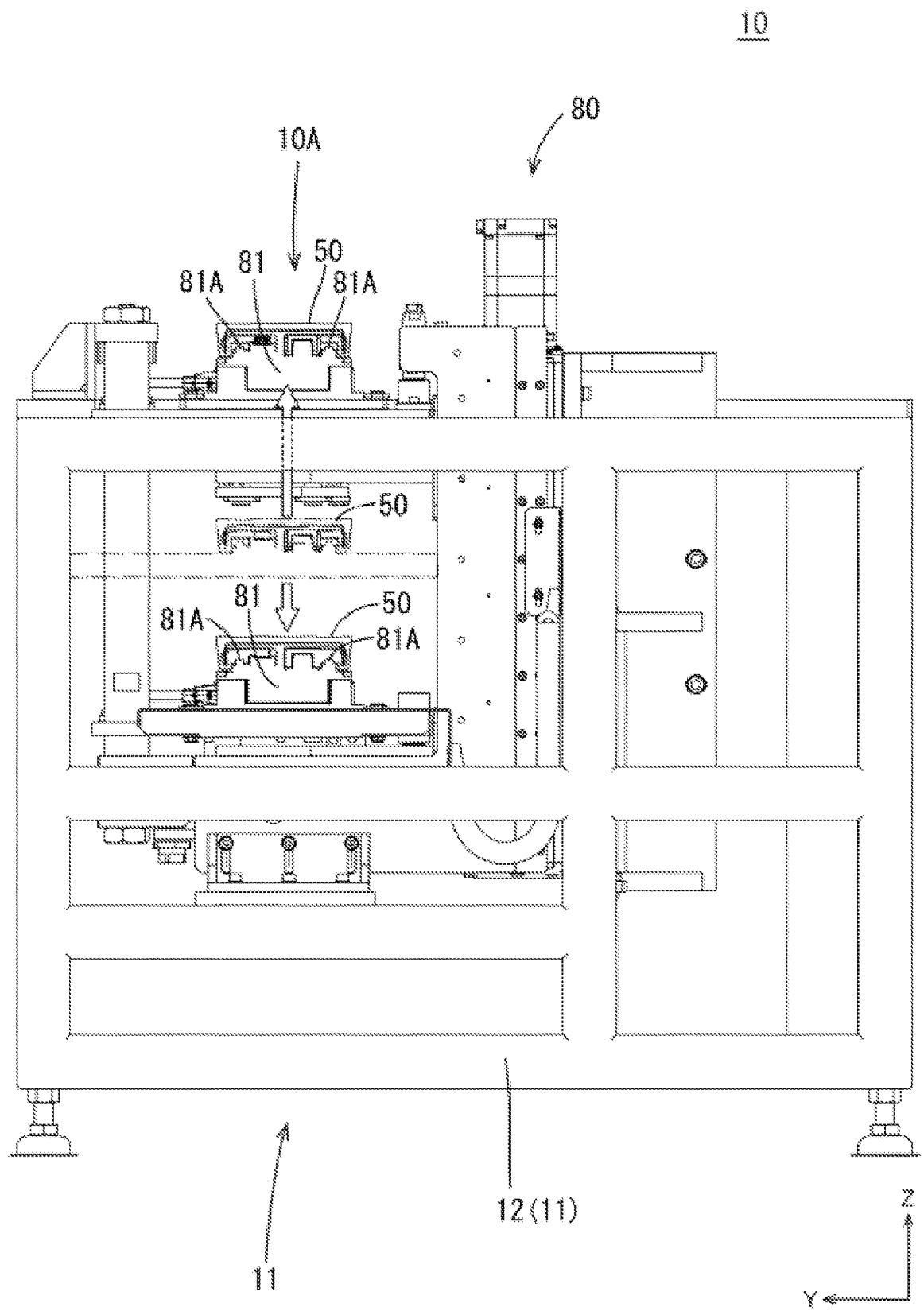
FIG. 3 is a right side view of the linear conveyor device.

As illustrated in FIG. 2, the two lifting and lowering devices 80 are arranged in two end portions of a group of the fixed modules 20, respectively, and the two lifting and lowering devices 80 and the fixed modules 20 are arranged in a line. As illustrated in FIG. 4, each of the lifting and lowering devices 80 includes the lifting and lowering frame 81 (and the lifting and lowering rails 81A) that are disposed continuously from the frame 23 (and the rails 28) of the fixed module 20. As illustrated in FIG. 3, the lifting and lowering device 80 lifts or lowers the transfer slider 50 that has reached the predefined position on the lifting and lowering frame 81 by the driving of the driving motor (in FIG. 3, the lifting and lowering movement of the transfer slider 50 and the lifting and lowering frame 81 is illustrated with two-dot chain lines). After the transfer slider 50 is lifted or lowered by the driving of the lifting and lowering device 80, the traveling direction of the transfer slider 50 is reversed and the transfer slider 50 is transferred along the rails 28 of the fixed modules 20 on the different level.

Operations and Advantageous Effects of the Present Embodiment

The linear conveyor 10A is a linear conveyor that is fixed to the base member 11. As illustrated in FIG. 4, the linear conveyor 10A includes the transfer slider 50, the frame 23, the first support member 40, the second support member 42, and the sliding mechanism 60. The frame 23 includes the rails 28 that guide the transfer slider 50 in the traveling direction. The first support member 40 is arranged on one end side of the frame 23 in the longitudinal direction thereof and fixedly supports the frame 23 and is fixed to the base member 11. The second support member 42 is arranged on another end side of the frame 23 in the longitudinal direction thereof and supports the frame 23 to be movable and is fixed to the base member 11. The sliding mechanism 60 allows the relative sliding movement of the second support member 42 and the frame 23 in the longitudinal direction according to the difference in the thermal expansion and contraction amounts of the base member 11 and the frame 23.

The temperature of the frame 23 and the base member 11 increases due to the heat generated when the linear conveyor 10A starts driving. Unlike the above embodiment, if the frame 23 is fixed not only to the first support member 40 but also to the second support member 42 and the materials of the frame 23 and the base member 11 differ from each other, the frame 23 and the base member 11 are different in the coefficient of linear expansion and this creates thermal stress between the frame 23 and the base member 11 and warping may be caused in the frame 23. Even in the configuration including the frame 23 and the base member 11 made of the same material, if the shapes of the heat generating components of circuits, the frame, or the base member differ from each other, the thermal stress is created and warping may be caused in the frame 23.

Figure 7:
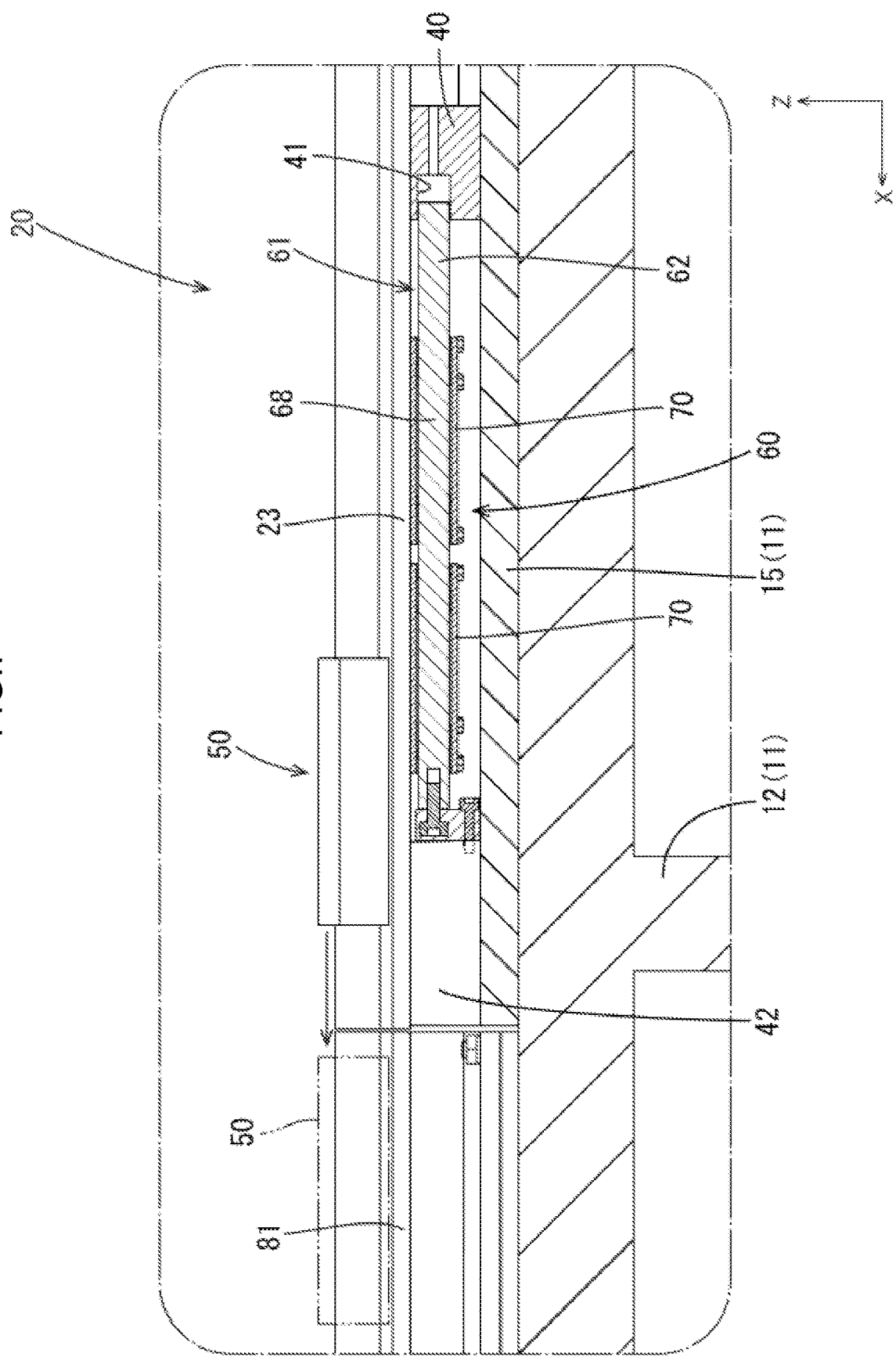
FIG. 7 is a cross-sectional view illustrating that the thermal expansion and contraction amount of a frame with respect to a base member changes from that in FIG. 4.
Figure 8:
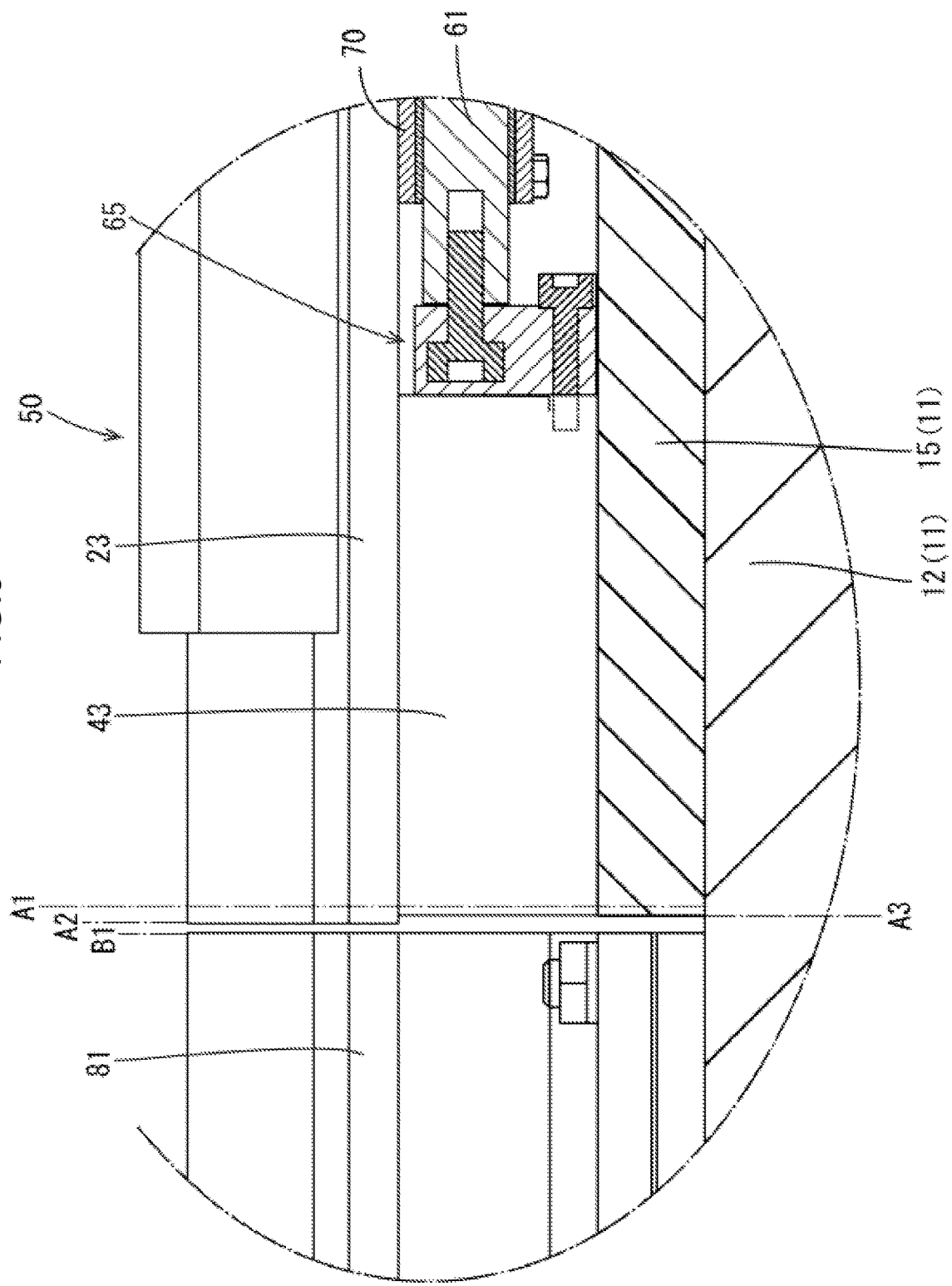
FIG. 8 is an enlarged view of a portion of FIG. 7.

In the present embodiment, the left end portion (the other end portion in the longitudinal direction) of the frame 23 is not fixed to the second support member 42. If the difference in the thermal expansion and contraction amounts is created between the base member 11 and the frame 23, the thermally expanded length of the frame 23 may be greater than that of the mounting plate 15 of the base member 11 due to the different materials as illustrated in FIG. 7. Even in such a configuration, as illustrated in FIG. 8, the end A2 of the frame 23 can move closer to the lifting and lowering device 80 than the end A3 of the mounting plate 15 of the base member 11 (and of the second support member 42) does. This suppresses occurrence of warping or deflection of the frame 23 (A1 in FIG. 8 represents the end of the frame 23 before the thermal expansion and contraction). The sliding mechanism 60 allows relative sliding movement of the second support member 42 and the frame 23 in the longitudinal direction according to the difference in the thermal expansion and contraction amounts of the base member 11 and the frame 23. With such a configuration, the position displacement of the frame 23 in a direction different from the longitudinal direction is less likely to be caused in the end portion thereof that is not fixed and near the second support member 42. Accordingly, the transfer slider 50 can smoothly travel between the adjacent rails 28.

The sliding mechanism 60 is fixed to the second support member 42 (one of the first support member 40 and the second support member 42) and includes the fitting portion 62 that is slidably fitted to the first support member 40 (another one of the first support member 40 and the second support member 42).

According to such a configuration, since the fitting portion 62 is slidably fitted to the first support member 40 (the other one of the first support member 40 and the second support member 42), occurrence of warping and deflection of the frame 23 can be suppressed and the traveling between the adjacent rails 28 can be performed smoothly with a simple structure. The sliding mechanism 60 is not necessarily fixed directly to the base member 11. Therefore, the base member 11 need not have a configuration (such as screw holes) for fixing the sliding mechanism 60 and the sliding mechanism 60 can be installed in the existing configuration easily.

The sliding mechanism 60 includes the tubular portions 70 that have a tubular shape and fixed to the frame 23 (one of the frame 23 and the second support member 42) and the insertion portion 68 that is fixed to the second support member 42 (the other one of the frame 23 and the second support member 42) is inserted in the tubular portions 70 to slide along the tubular portions 70.

According to such a configuration, if the difference is created in the thermal expansion and contraction amounts of the base member 11 and the frame 23, the position displacement in the direction different from the longitudinal direction is suppressed directly by the frame 23 (not via the first support member 40).

The tubular portion 70 includes the linear bushings 72 that slide with respect to the insertion portion 68 and the holder portion 71 that holds the linear bushings 72.

According to such a configuration, the wearing between the inner surface of the tubular portion 70 and the outer surface of the insertion portion 68 can be suppressed.

The linear conveyor includes the fixed modules 20 and the lifting and lowering devices 80. The fixed module 20 includes the frame 23, the first support member 40, the second support member 42, and the sliding mechanism 60. The lifting and lowering device 80 includes the lifting and lowering frame 81 including the lifting and lowering rails 81A. The lifting and lowering rails 81A are linearly arranged next to the respective rails 28 of the frame 23 of the fixed module 20. The lifting and lowering device 80 lifts and lowers the transfer slider 50.

According to such a configuration, the transfer slider 50 is lifted or lowered by the lifting and lowering device 80. Therefore, in the configuration that requires position accuracy between the rails 28 and 81A for smooth travel between the rails 28 and 81A, problems are less likely to be caused in traveling between the rails 28 and 81A.

Second Embodiment

Next, a second embodiment will be described with reference to FIGS. 9 to 12. A linear conveyor 90 of the second embodiment includes a sliding mechanism 91 instead of the sliding mechanism 60 of the first embodiment. The sliding mechanism 91 includes auxiliary rails 92 and auxiliary sliders 93. In the following description, the components same as those of the first embodiment are represented by the same symbols and will not be described.

Figure 9:
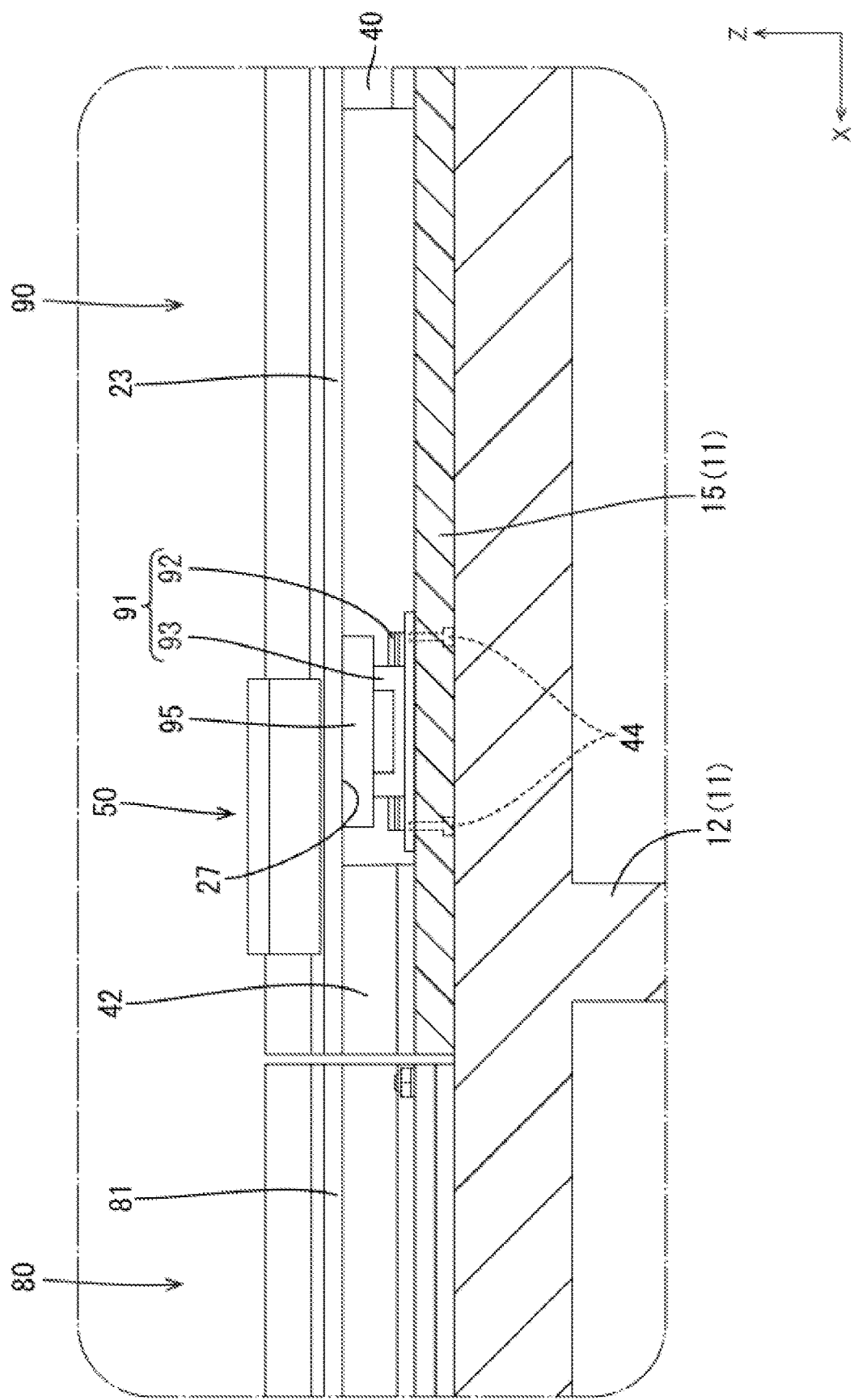
FIG. 9 is a cross-sectional view of a portion of a linear conveyor including a sliding mechanism according to a second embodiment taken along a X-Z plane perspective view.
Figure 10:
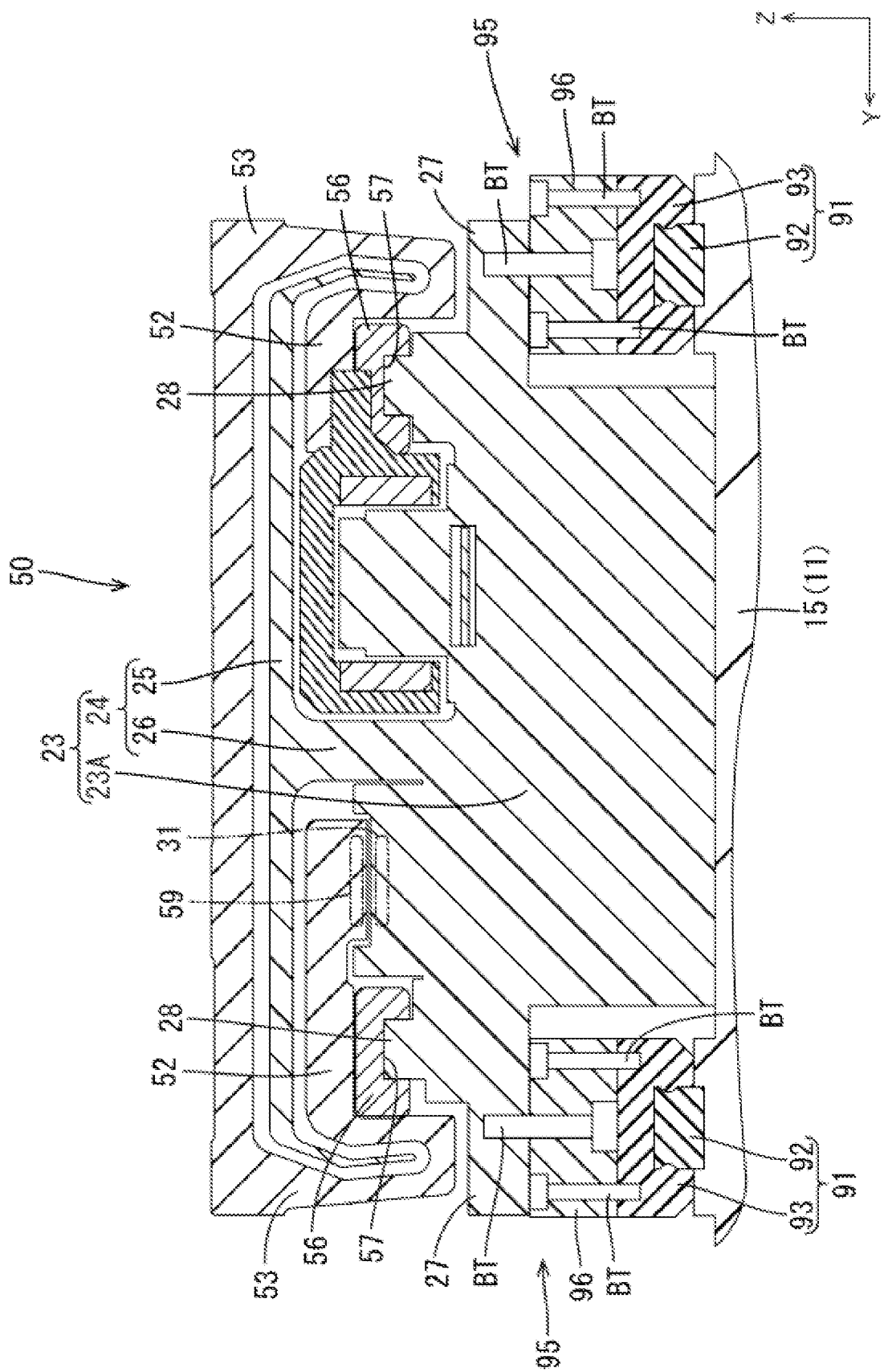
FIG. 10 is a cross-sectional view of a portion of the linear conveyor including the sliding mechanism taken along a Y-Z plane.

As illustrated in FIGS. 9 and 10, the sliding mechanism 91 is arranged near the second support member 42 and between the first support member 40 and the second support member 42 on the base member 11. The sliding mechanism 91 includes two auxiliary rails 92 extending in the right-left direction (the traveling direction). The auxiliary rails 92 are fixed to the mounting plate 15 of the base member 11 with the fixing members 44 such as bolts. The auxiliary sliders 93 are fixed to the respective mount portions 27 of the frame 23 via a connection fixing portion 95. As illustrated in FIG. 10, the connection fixing portion 95 includes a fixing plate 96 and bolts BT with which the fixing plate 96 is fixed to the mount portion 27 and the auxiliary slider 93. The fixing plate 96 includes screw holes and the bolts BT are inserted in the respective screw holes and screwed up such that the auxiliary slider 93 is fixed to the mount portion 27 while having the fixing plate 96 therebetween. The auxiliary rails 92 and the auxiliary sliders 93 have lengths so as to move relatively each other to absorb the difference in the thermal expansion and contraction amounts of the frame 23 and the base member 11. In the present embodiment, the length of the auxiliary sliders 93 in the right-left direction is smaller than the length of the auxiliary rails 92 in the right-left direction.

Figure 11:
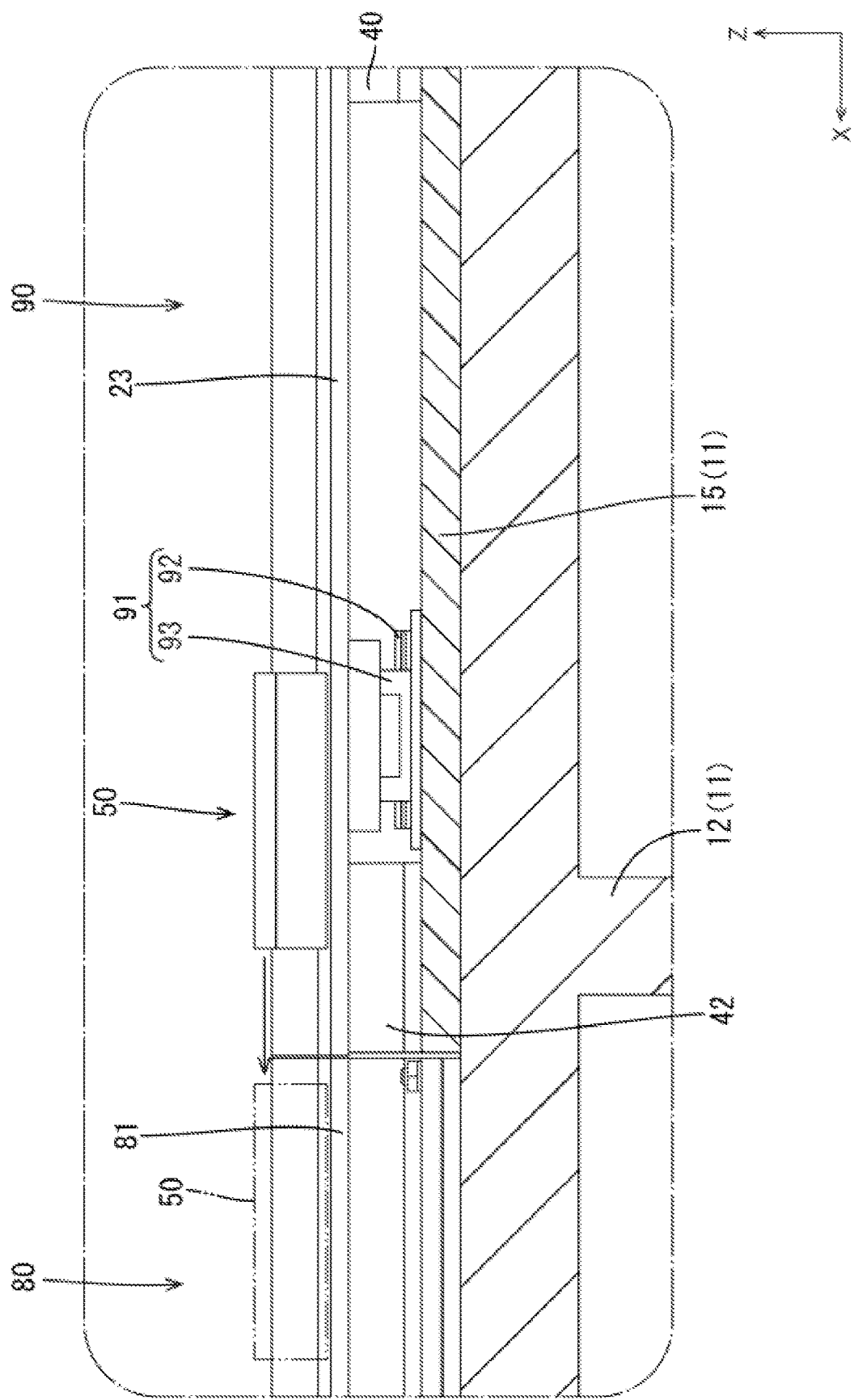
FIG. 11 is a cross-sectional view illustrating that the thermal expansion and contraction amount of a frame with respect to a base member changes from that in FIG. 9.
Figure 12:
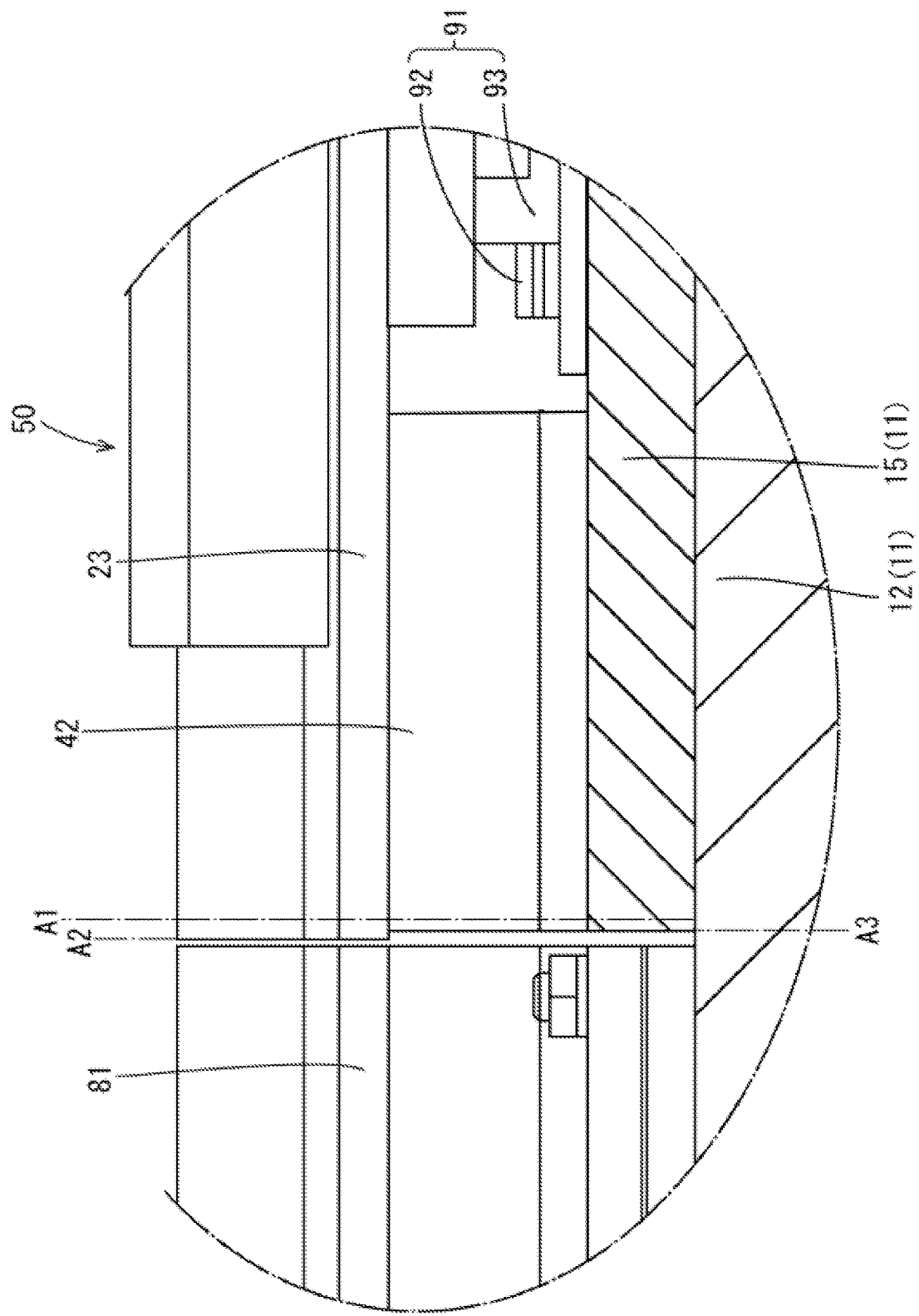
FIG. 12 is an enlarged view of a portion of FIG. 11.

In the second embodiment, if the thermally expanded length of the frame 23 is greater than that of the mounting plate 15 of the base member 11 due to the difference in the materials thereof as illustrated in FIG. 11, the end A2 of the frame 23 is moved closer to the lifting and lowering device 80 than the end A3 of the mounting plate 15 of the base member 11 (and of the second support member 42) does as illustrated in FIG. 12. This suppresses the warping and deflection of the frame 23. Since the auxiliary rails 92 and the auxiliary sliders 93 allow relative movement of the second support member 42 and the frame 23 in the longitudinal direction according to the difference in the thermal expansion and contraction amounts of the base member 11 and the frame 23, the position displacement of the frame 23 in the direction different from the longitudinal direction is suppressed at the portion of the frame 23 that is near the second support member 42 and not fixed. Accordingly, the problems are less likely to be caused when the transfer slider 50 travels between the adjacent rails 28.

The sliding mechanism 91 includes the auxiliary rails 92 that are fixed to the base member 11 (one of the base member 11 and the frame 23) and the auxiliary sliders 93 that are fixed to the frame 23 (another one of the base member 11 and the frame 23) and can slide with respect to the auxiliary rails 92.

According to such a configuration, the first support member 40 or the second support member 42 is not necessarily processed to provide the sliding mechanism 91. Therefore, the first support member 40 or the second support member 42 need not be prepared as an exclusive component and this reduces a manufacturing cost. The sliding mechanism 91 can be additionally installed in the existing configuration easily.

Third Embodiment

Next, a third embodiment will be described with reference to FIGS. 13 to 15. A linear conveyor 100 of the third embodiment includes a sliding mechanism 101 between the frame 23 and a second support member 104 unlike the sliding mechanism 91 of the second embodiment. In the following description, the components same as those of the above embodiment are represented by the same symbols and will not be described.

Figure 13:
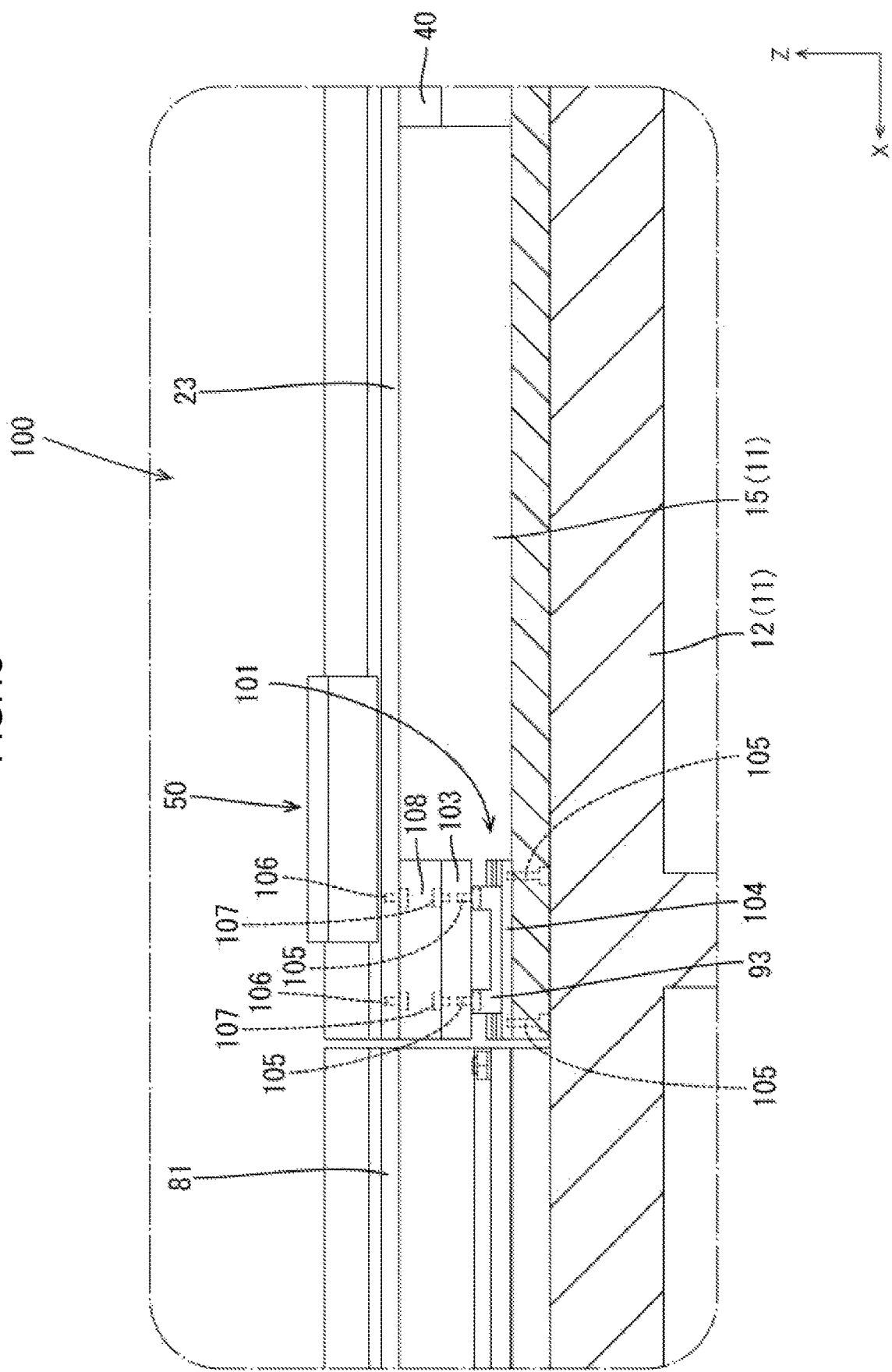
FIG. 13 is a cross-sectional view of a portion of a linear conveyor including a sliding mechanism according to a third embodiment taken along a X-Z plane.

As illustrated in FIG. 13, the sliding mechanism 101 includes the auxiliary rails 92 that are fixed on the base member 11 and the auxiliary sliders 93 that are fixed on an end portion side of the frame 23. The second support member 104 that supports the weight on the end portion side of the frame 23 is made of metal such as aluminum alloy and has a small height dimension. The auxiliary rails 92 are fixed on the second support member 104. The second support member 104 is fixed to the mounting plate 15 of the base member 11 with fixing members 105 such as bolts. A circuit unit 108 is arranged below the left end portion of the frame 23. The circuit unit 108 includes a circuit provided on a board and a case having the circuit therein. The circuit unit 108 is fixed to the frame 23 with fixing members 106 such as bolts. A spacer unit 103 is fixed to the circuit unit 108 with fixing members 107 such as bolts and is disposed below the circuit unit 108. The spacer unit 103 and the auxiliary slider 93 are fixed to each other via the fixing members 105 such as bolts. The auxiliary slider 93, the spacer unit 103, and the circuit unit 108 support the frame 23 while being able to slide on the second support member 104 and the auxiliary rails 92 in the longitudinal direction of the frame 23.

Figure 14:
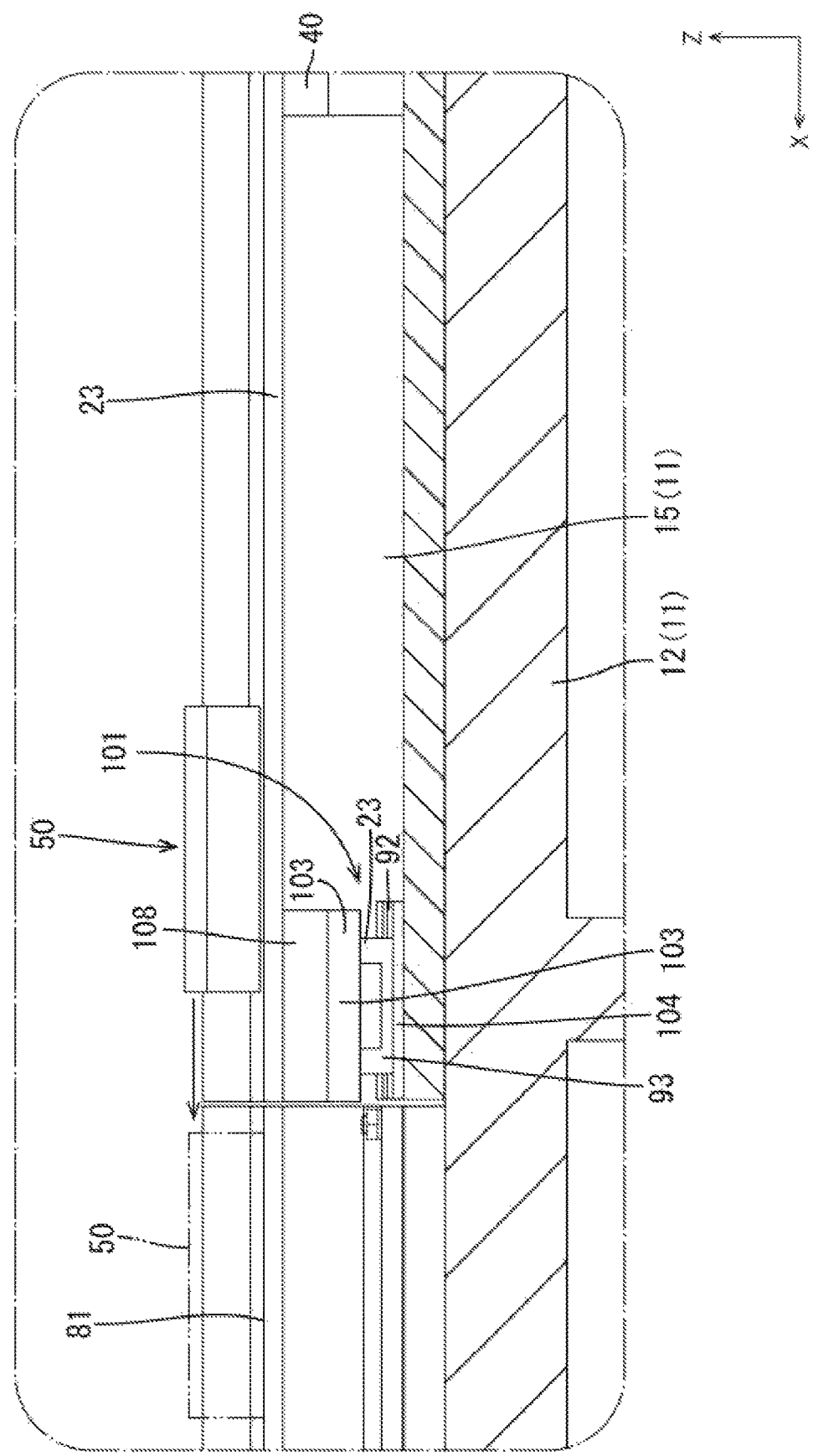
FIG. 14 is a cross-sectional view illustrating that the thermal expansion and contraction amount of a frame with respect to a base member changes from that in FIG. 13.

According to the third embodiment, if the thermally expanded length of the frame 23 is greater than that of the mounting plate 15 of the base member 11 due to the difference in the materials thereof as illustrated in FIG. 14, the end A2 of the frame 23 is moved closer to the lifting and lowering device 80 than the end A3 of the mounting plate 15 of the base member 11 does as illustrated in FIG. 15. This suppresses the warping and deflection of the frame 23. Furthermore, the sliding mechanism 101 includes the auxiliary rails 92 that are fixed to the second support member 104 (one of the second support member 104 and the frame 23) and the auxiliary sliders 93 that are fixed to the frame 23 (other one of the second support member 104 and the frame 23). According to such a configuration, the frame 23 is not fixed to the second support member 104 by including the auxiliary rails 92 and the auxiliary slider 93, and this simplifies the configuration.

Other Embodiments

The technology described herein is not limited to the embodiments described in the above description and the drawings. The following embodiments may be included in the technical scope of the technology described herein, for example.

(1) In the first embodiment, the shaft portion 61 that is fixed to the second support member 42 is inserted in the tubular portion of the frame 23 and is fitted in the fitting portion 41 of the first support member 40. However, the tubular portion may be fixed to the second support member 42 instead of the shaft portion 61 and the frame 23 or the first support member 40 may include a shaft portion that is to be inserted in the tubular portion 70.

(2) In each of the second embodiment and the third embodiment, the auxiliary rails 92 are fixed to the base member 11 and the auxiliary sliders 93 are fixed to the frame 23 side. However, the auxiliary rails 92 may be fixed to the frame 23 side and the auxiliary sliders 93 may be fixed to the base member 11 side.

(3) The tubular portion 70 includes the linear bushings 72 in addition to the holder portion 71 but may not include the linear bushings 72.

(4) The dimension of the gap G between the frame 23 of the fixed module and the lifting and lowering frame 81 of the lifting and lowering device 80 is changed by the thermal expansion or contraction of the frame 23; however, the device may be configured as follows. A dimension of a gap between (the frames 23 of) the adjacent fixed modules may be changed according to the thermal expansion and contraction of the frame 23 and at least one of the adjacent fixed modules may include the sliding mechanism 60.

(5) Two lifting and lowering devices are included; however, the lifting and lowering devices may not be included. For example, the linear conveyor may be configured such that the transfer slider 50 travels only linearly. The fixed modules 20 may be arranged on a same level and a moving device that moves between the fixed modules 20 may be included. The number of fixed modules 20 is not limited to the one in the above embodiments and a linear conveyor may include any number of fixed modules 20.

What is claimed is:

1. A linear conveyor fixed to a base member, the linear conveyor comprising:
   a transfer slider;
   a frame including a rail along which the transfer slider is configured to move in a traveling direction;
   a first support member that is disposed on one end side of the frame with respect to a longitudinal direction of the frame and is fixed to the base member and the frame and supports the frame;
   a second support member that is disposed on another end side of the frame with respect to the longitudinal direction of the frame and fixed to the base member and supports the frame such that the frame is not fixed with respect to the second support member; and
   a sliding mechanism with which the second support member and the frame relatively move in the longitudinal direction according to difference in thermal expansion and contraction amounts of the base member and the frame.

2. The linear conveyor according to claim 1, wherein the sliding mechanism is fixed to one of the first support member and the second support member and includes a fitting portion that is fitted to another one of the first support member and the second support member so as to be able to slide.

3. The linear conveyor according to claim 2, wherein the sliding mechanism includes
   a tubular portion that is fixed to one of the second support member and the frame, and
   an insertion portion that is fixed to another one of the second support member and the frame and inserted in the tubular portion so as to be able to slide.

4. The linear conveyor according to claim 2, wherein the sliding mechanism includes
   an auxiliary rail that is directly fixed to one of the base member and the frame, and
   an auxiliary slider that is directly fixed to another one of the base member and the frame and slides with respect to the auxiliary rail.

5. The linear conveyor according to claim 2, wherein the sliding mechanism includes
   an auxiliary rail that is directly fixed to one of the second support member and the frame, and
   an auxiliary slider that is directly fixed to another one of the second support member and the frame and slides with respect to the auxiliary rail.

6. The linear conveyor according to claim 2, further comprising:
   a fixed module including the frame, the first support member, the second support member, and the sliding mechanism; and
   a lifting and lowering device including a lifting and lowering frame including a lifting and lowering rail that is arranged linearly adjacent to the rail of the frame of the fixed module in an elongated direction, and the lifting and lowering device is configured to lift and lower the transfer slider.

7. The linear conveyor according to claim 1, wherein the sliding mechanism includes
   a tubular portion that is fixed to one of the second support member and the frame, and
   an insertion portion that is fixed to another one of the second support member and the frame and inserted in the tubular portion so as to be able to slide.

8. The linear conveyor according to claim 7, wherein the tubular portion includes a linear bushing that is slidable with respect to the insertion portion and a holder portion that holds the linear bushing.

9. The linear conveyor according to claim 8, wherein the sliding mechanism includes
   an auxiliary rail that is directly fixed to one of the base member and the frame, and
   an auxiliary slider that is directly fixed to another one of the base member and the frame and slides with respect to the auxiliary rail.

10. The linear conveyor according to claim 7, wherein the sliding mechanism includes
    an auxiliary rail that is directly fixed to one of the base member and the frame, and
    an auxiliary slider that is directly fixed to another one of the base member and the frame and slides with respect to the auxiliary rail.

11. The linear conveyor according to claim 1, wherein the sliding mechanism includes
    an auxiliary rail that is directly fixed to one of the base member and the frame, and
    an auxiliary slider that is directly fixed to another one of the base member and the frame and slides with respect to the auxiliary rail.

12. The linear conveyor according to claim 1, wherein the sliding mechanism includes
    an auxiliary rail that is directly fixed to one of the second support member and the frame, and an auxiliary slider that is directly fixed to another one of the second support member and the frame and slides with respect to the auxiliary rail.

13. The linear conveyor according to claim 1, further comprising:
a fixed module including the frame, the first support member, the second support member, and the sliding mechanism; and
a lifting and lowering device including a lifting and lowering frame including a lifting and lowering rail that is arranged linearly adjacent to the rail of the frame of the fixed module in an elongated direction, and the lifting and lowering device is configured to lift and lower the transfer slider.

14. A linear conveyor fixed to a base member, the linear conveyor comprising:
a transfer slider:
a frame having a long shape extending in a longitudinal direction and including a rail along which the transfer slider is configured to move in a traveling direction;
a first support member that is disposed on one end side of the frame with respect to the longitudinal direction and is fixed to the base member and the frame;
a second support member that is disposed on another end side of the frame with respect to the longitudinal direction and fixed to the base member and supports the frame such that the frame is not fixed with respect to the second support member; and
a sliding mechanism including a first member that is fixed to the frame and a second member that is fixed to the base member, and the first member and the second member being in contact with each other and able to slide with each other.

15. The linear conveyor according to claim 14, wherein the second member is fixed to the base member via the second support member.

16. The linear conveyor according to claim 14, wherein the first support member includes a fitting portion,
the second member includes a fitting portion that is fitted to the fitting portion of the first support member such that the second member is able to slide with respect to the first support member.

17. The linear conveyor according to claim 14, wherein the first member having a tubular elongated shape extending in the longitudinal direction and fixed to the frame,
the second member having an elongated shape extending in the longitudinal direction and one end portion that is fixed to the second support member, the second member being inserted in the first member such that the first member and the second member slide with respect to each other in the longitudinal direction.

18. The linear conveyor according to claim 14, wherein the second support member is in contact with the frame and the base member.

19. The linear conveyor according to claim 14, wherein the first member is an auxiliary slider and the second member is an auxiliary rail along which the auxiliary slider slides.

20. The linear conveyor according to claim 19, wherein the auxiliary rail extends in the longitudinal direction and the auxiliary slider is configured to slide in the longitudinal direction according to difference in thermal expansion and contraction amounts of the base member and the frame.

* * * * *